Feb. 26, 1946. T. B. CRAWFORD ET AL 2,395,536
FLOW CONDITION TESTER
Filed Dec. 2, 1943
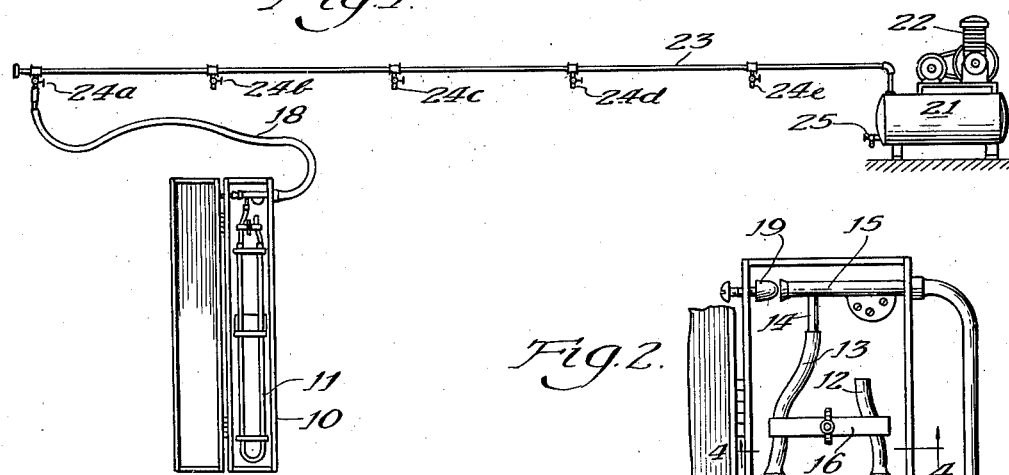
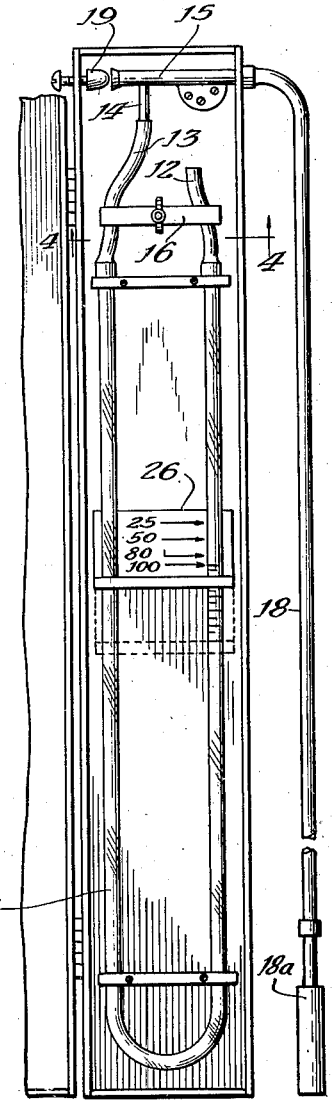
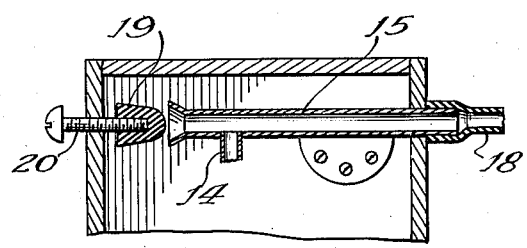
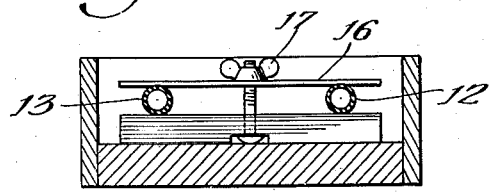
Inventors:
Thomas B. Crawford
Joseph E. Vilbig
By: Chritton, Wiles, Davies, Schroeder & Merriam
Attorneys Patented Feb. 26, 1946

2,395,536

UNITED STATES PATENT OFFICE 2,395,536

FLOW CONDITION TESTER

Thomas B. Crawford, Crown Point, Ind., and Joseph E. Vilbig, Chicago, Ill., assignors to Babson Bros. Co., a corporation of Illinois Application December 2, 1943, Serial No. 512,550

2 Claims. (Cl. 137—77)

This invention relates to a flow condition tester, and more particularly to portable apparatus for testing the condition of vacuum systems of the type used in dairy barns for actuating milking machines.

One feature of this invention is that it provides an indication of the effectiveness of the vacuum system; another feature is that it provides an indication of flow conditions in the system, and more particularly obstructions or leaks; still another feature of this invention is that it enables quick and convenient location of difficulties in the system; yet another feature is that the apparatus includes a sensitive pressure indicating device, and means for adjusting the apparatus to provide indications within the range of the sensitive indicating means despite wide variations in the capacity of the system; a further feature of the invention is the association of a U-tube having a light liquid therein with an adjustable opening and an adjustable scale; and yet a further feature is the provision of means for preventing loss of liquid from the U-tube during carrying of the apparatus. Other features and advantages of the invention will be apparent from the following specification and the drawing, in which:

Figure 1 is a view indicating the apparatus in action on a simple vacuum system of the kind used in diary barns; Figure 2 is an enlarged view of the operative portion of the apparatus forming the subject matter of this invention; Figure 3 is a partial sectional view of the uppermost portion of the apparatus as shown in Figure 2, and in the same plane as that figure; and Figure 4 is a transverse sectional view along the line 4—4 of Figure 2.

While the testing apparatus and method which is the subject matter of this invention is applicable to a large number of situations where it is desirable to test flow conditions, it was particularly designed and adapted for use in testing vacuum systems of the kind generally installed in a dairy barn for actuating the milking machines, and it will be described in connection with such a system.

A dairy barn vacuum system comprises a source of vacuum, generally a tank and pump, and lengths of wall pipe connected to this source and running along back of each row of stalls. These pipes are provided with connecting means at appropriate intervals, these generally being manually operable cocks termed stall cocks. When such a system is installed the ends of the pipes are sometimes not properly reamed out after sawing, leaving burs which obstruct flow through the pipe at the joints; bits of hay and other dirt get into the pipes and sometimes build up obstructions which, while they do not completely block the pipe, greatly reduce the effectiveness of the vacuum system during operation of the milkers; joints or stall cocks sometimes develop small leaks which reduce the effectiveness; or, in other ways, the operative effectiveness of the system may be reduced below that available at the source.

In the particular embodiment of the invention illustrated herewith, a carrying case 10 provides a housing and mounting for a glass U-tube 11 having therein water, alcohol or some other light liquid, preferably colored. The tube would normally have a total height of only about a foot and a half so that when one end is left open and the other end connected to a point which is lower than atmospheric pressure, the device forms a sensitive pressure indicating means, since a difference of a few ounces in pressure would make quite a few inches difference in the relative level of the liquid in the two legs of the tube. The right-hand side of the tube (speaking with respect to the position as shown in the drawing) has an open-end rubber tube 12 connected thereto, while the left-hand side is connected, through a rubber tube 13, to a connector tube 14 opening into and through one wall of the main flow tube 15. A cross bar 16 lies across the two rubber tubes and is adapted to be clamped down on the tubes, by the use of the wing nut 17 to close the tubes off when desired. While the apparatus is being carried from place to place, the rubber tubes would be closed off in this manner to prevent loss of liquid from the U-tube, and when the apparatus was to be used, it would be stood up vertically, as illustrated in Figure 1, and the tubes unclamped or opened, as illustrated in Figure 4.

The flow tube 15 is of metal or any appropriate rigid material, preferably half an inch or more in diameter. A rubber tube 18 is connected to one end of the flow tube, the other end of this tube 18 being provided with a coupler 18a adapted to be slipped onto a stall cock. The other end of the flow tube 15 is flared somewhat, as may be best seen in Figure 3, and has associated therewith a plug member 19 movable toward and away from the end of the tube by rotation of the mounting screw 20. This arrangement provides means for adjusting the effective opening to atmosphere at this left-hand end of the flow tube. Associated with the U- tube is a vertically movable scale 26, as may be best seen in Figure 2. This member 26 may be slid up and down (as for example, from a position shown in solid lines to a position shown in dotted lines); and is provided with markings graduated in percentage and adapted to cooperate with the right-hand leg of the U-tube.

Referring now more particularly to Figure 1, the vacuum system is illustrated as including a source of vacuum comprising a tank 21 associated with a motor driven vacuum pump 22; and a length of pipe 23, representative of the pipe which would run along back of the stalls. This pipe is connected to the tank 21 at one end, and plugged at the other end; and it is provided with spaced stall cocks at appropriate intervals, as the stall cocks 24a—24e. The tank is also provided with a stall cock, here identified as 25, which may also be used as a drain cock.

When the service man wishes to test the effectiveness of the vacuum system in the dairy barn, he would first connect the coupler 18a to the stall cock 25, adjust the plug 19 to a position considerably spaced from the cooperating end of the flow tube 15, and open the cock—with the vacuum pump running, of course. The plug member 19 would then be gradually moved in toward the end of the flow tube 15, by use of the adjustment screw 20, until the pressure conditions in the flow tube 15, communicated through the connecting tubes 14 and 13 to the left-hand leg of the U-tube, were such that the liquid level in the left-hand leg was in the neighborhood of 4" above that in the right-hand leg, at least somewhere between three and five inches. The scale member 26 would then be moved up and down until its 100% marking corresponded exactly with the level of the liquid in the right-hand leg. While, at least in theory, the scale could be fixed and all adjustment done by movement of the plug member 19, this adjustment is so sensitive that it is preferable to have the scale movable, so that there are in reality two steps of adjustment performed initially. This adjustment is necessary because the source of vacuum may comprise a pump of very low capacity only intended to handle a single milking machine; or it may comprise a pump of considerable capacity adapted to handle a number of milking machines at once. many installations being intended to handle 18 milking machines. Because of the use of a relatively light liquid (as contrasted with mercury) in the indicating device, it is quite sensitive to small changes in pressure; and the initial adjustment enables determination of an initial reference point within the desired operating range of the pressure indicating device regardless of the capacity of the pump.

The service man would then connect the apparatus to the stall cock most remote from the source of vacuum, as to stall cock 24a as illustrated in Figure 1. If the level of liquid in the right-hand leg remains even with the 100% graduation on the scale (without any change in the position of the plug member 19 or of the scale member 26, of course), the system is in good condition and need be tested no further. If the level of liquid in the right-hand leg rises, however, as for example to the 50% graduation, it indicates that the effectiveness at this farthest stall cock under conditions of flow is poor. The whole pipe may then be flushed out with a lye solution; and if this does not obviate the difficulty, the test is carried on to localize the trouble. To do this the tester is successively connected to the various stall cocks. If the indication is 50% when the tester is connected to the stall cocks 24a, 24b and 24c, but is the full 100% available at the source when connected to the cocks 24d and 24e, it indicates that there is either an obstruction in the pipe 23 between the stall cocks 24c and 24d, or that there is a leak in the stall cock 24d. This latter matter may be tested by screwing the plug member 19 all the way in until it fully closes the cooperating end of the flow tube 15, whereupon connection of the coupler 18a to the cock 24d (leaving it closed) will disclose even the most minute leak. If this cock proves to have no leak, it is obvious that there is an obstruction in the section of pipe between the cocks 24d and 24c, and this section of pipe may be taken out and burrs or other difficulties removed. Also, if the test determinations showed 100% readings on the cocks 24a, 24b, 24d and 24e, but only a 25 or 50% reading, for example, when connected to stall cock 24c (and the cock opened) a clear indication is given of the fact that the line or pipe is in good condition but that stall cock 24c is itself plugged. If desired, each of the hoses used to connect the milking machine to the stall cocks may be connected to a stall cock and the tester connected to the other end of the hose. When the stall cock is opened, the connector hose then becomes a part of the system and any obstructions in it (as by swelling of the rubber, accumulation of milk solids or the like) is shown up on the tester.

The vacuum systems used in dairy barns are almost always provided with a vacuum gauge (generally of the mechanical type as distinguished from the liquid type used in this tester), but this gauge will not show up obstructions or difficulties which considerably reduce the effectiveness of the milking machines. A very sensitive pressure indicating device is needed for this; and the test must be made under conditions of flow, rather than as a matter of absolute pressure. As long as the pipe 23 was open at all, even though it was seriously plugged, the pressure at the farthest stall cock 24a would be the same as at the source if a conventional type of pressure gauge were used. The test must be made while there is a substantial flow of air through the system; so that, while a pressure device is used to provide the indication, the test is really a test of flow condition rather than of pressure.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. Apparatus of the character described for indicating flow conditions in a piping system being tested, including: means for indicating small variations in fluid pressure, this indicating means comprising a transparent U-tube having a liquid of low specific gravity therein, and a movable scale associated with the U-tube; means for providing a connection between one end of the tube and the interior of the piping system at any one of several selective points; means for creating a partial vacuum in said system; a flow tube connecting the other end of the first mentioned tube with said indicating means, said flow tube having an opening leading to the atmosphere; and adjustable means adjacent said opening for adjusting the effective flow of atmospheric air through said opening, whereby obstructions in the piping system may be located.

2. Apparatus of the character described for indicating flow conditions in a piping system being tested, including: means for indicating small variations in fluid pressure, this indicating means comprising a transparent U-tube having a liquid of low specific gravity therein, the indicating means being readily portable and including means for sealing the ends of the U-tube to prevent loss of liquid therefrom during transportation; means for providing a connection between one end of the tube and the interior of the piping system at any one of several selective points; means for creating a partial vacuum in said system; a flow tube connecting the other end of the first mentioned tube with said indicating means, said flow tube having an opening leading to the atmosphere; and adjustable means adjacent said opening for adjusting the effective flow of atmospheric air through said opening, whereby obstructions in the piping system may be located.

THOMAS B. CRAWFORD.
JOSEPH E. VILBIG.